(12) United States Patent
Vignotto et al.

(10) Patent No.: US 6,786,644 B2
(45) Date of Patent: Sep. 7, 2004

(54) SEALING DEVICE FOR ROLLING BEARINGS

(75) Inventors: Angelo Vignotto, Turin (IT); Claudio Savarese, Airasca (IT)

(73) Assignee: SKF Industrie S.P.A., Turin (IT)

( * ) Notice: Subject to any disclaimer, the term of this patent is extended or adjusted under 35 U.S.C. 154(b) by 0 days.

(21) Appl. No.: 10/235,479

(22) Filed: Sep. 4, 2002

(65) Prior Publication Data

US 2003/0059141 A1 Mar. 27, 2003

(51) Int. Cl.$^7$ .............................................. F16C 33/76
(52) U.S. Cl. ................................... 384/484; 384/481
(58) Field of Search .............................. 384/484, 485, 384/486, 477, 481, 489; 464/178; 301/105.1, 122

(56) References Cited

U.S. PATENT DOCUMENTS

| 5,674,011 A | 10/1997 | Hofmann et al. ............ 384/448 |
| 6,135,571 A | 10/2000 | Mizukoshi et al. ...... 301/105.1 |
| 6,464,399 B1 | 10/2002 | Novak et al. ................ 384/477 |
| 2002/0072421 A1 | 6/2002 | Ouchi .......................... 464/178 |
| 2002/0086736 A1 | 7/2002 | Ouchi et al. ................. 464/145 |
| 2003/0060294 A1 | 3/2003 | Ouchi ......................... 464/178 |

FOREIGN PATENT DOCUMENTS

| DE | 100 09 216 | 8/2001 |
| JP | 2002-195280 | 7/2002 |

*Primary Examiner*—William C. Joyce
(74) *Attorney, Agent, or Firm*—Merchant & Gould, P.C.

(57) ABSTRACT

Sealing device (1) for a rolling bearing (2) including: an inner race (5), which is axially blocked by a blocking element (4) suitable for being arranged in contact with a reference element (6); a distance ring (8) which is made of plastic material and which is interposed between the blocking element (4) and the reference element (6); a snap fastening element (9) which is integral to the distance ring (8) in order to fasten the distance ring (8) itself to the blocking element (4); and an external covering (10) made of rubber material and arranged outside the snap fastening element (9) in order to guarantee at least one static seal between the inner race (5) and the blocking means (4) and between the blocking means (4) and the reference element (6).

11 Claims, 2 Drawing Sheets

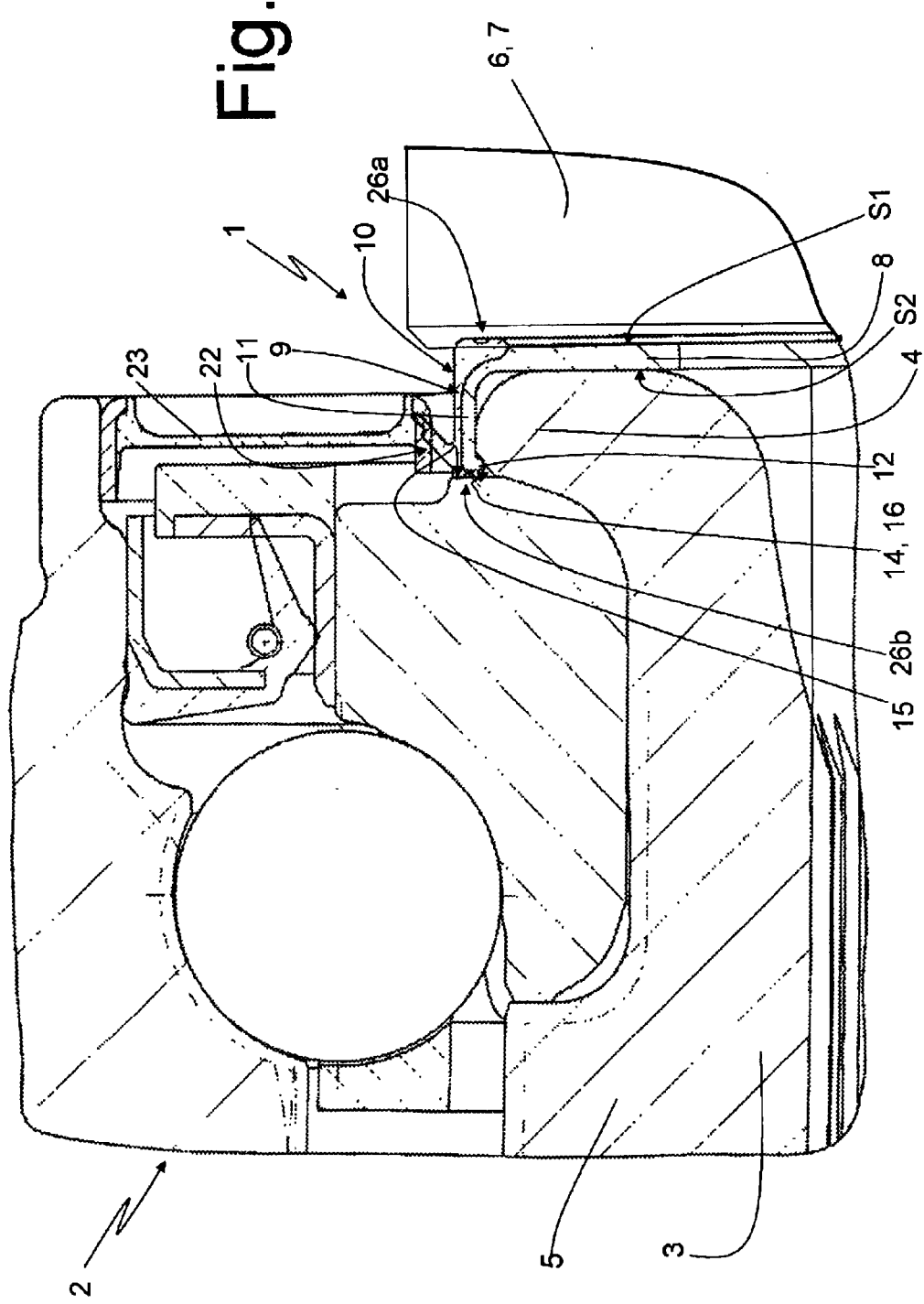

SEALING DEVICE FOR ROLLING BEARINGS

CROSS-REFERENCE TO RELATED APPLICATIONS

This application claims priority under 35 U.S.C. § 119 to Italian patent application number TO2001A000849, with a filing date of Sep. 6, 2001.

BRIEF SUMMARY OF THE INVENTION

The present invention relates to a sealing device for rolling bearings.

In general, the device described in the present invention is advantageously applied in the field of rolling bearings for wheel hubs and, in particular, it is used for rolling bearings for wheel hubs which are blocked on the own inner race of a rolled rim on the inner race itself and which belongs to the wheel hub.

In the particular case in which the wheel hubs described above are assembled to a constant velocity universal joint in such a way that the rolled rim is arranged in direct contact with a shoulder of the universal joint itself, a disadvantage arises due to the infiltration of detritus between the inner race and the rolled rim and between the rolled rim and the universal joint, and a further disadvantage arises due to the imperfect flatness of the two contact surfaces between the rolled rim and the shoulder, a factor which causes undesirable background noise when the rolling bearing has to bear heavy loads.

The aim of the present invention is to produce a sealing device for rolling bearings which will be able to resolve the above-described disadvantages in a simple and cost-effective fashion.

According to the present invention, a sealing device for rolling bearings will be produced comprising an inner race, which is axially blocked by a blocking element which is suitable for being arranged in direct contact with a reference element, the sealing device being characterised by the fact that it comprises a distance ring which is made of plastic material and which is interposed between the blocking element and the reference element; the sealing device also comprises snap fastening means which are integral to the distance ring and which are used for fastening the distance ring itself to the blocking element; the sealing device also comprises an external covering which is made of rubber material and which is arranged outside the snap fastening means in order to guarantee at least one static seal between the inner race and the blocking element and between the blocking element and the reference element.

BRIEF DESCRIPTION OF THE DRAWINGS

The present invention will now be described with reference to the attached drawings, which illustrate a non-limiting embodiment of the present invention, and in which;

FIG. 1 shows an axial section, with some parts removed for reasons of clarity, of preferred form of embodiment of the sealing device of the present invention;

DETAILED DESCRIPTION OF THE INVENTION

Figure 3:
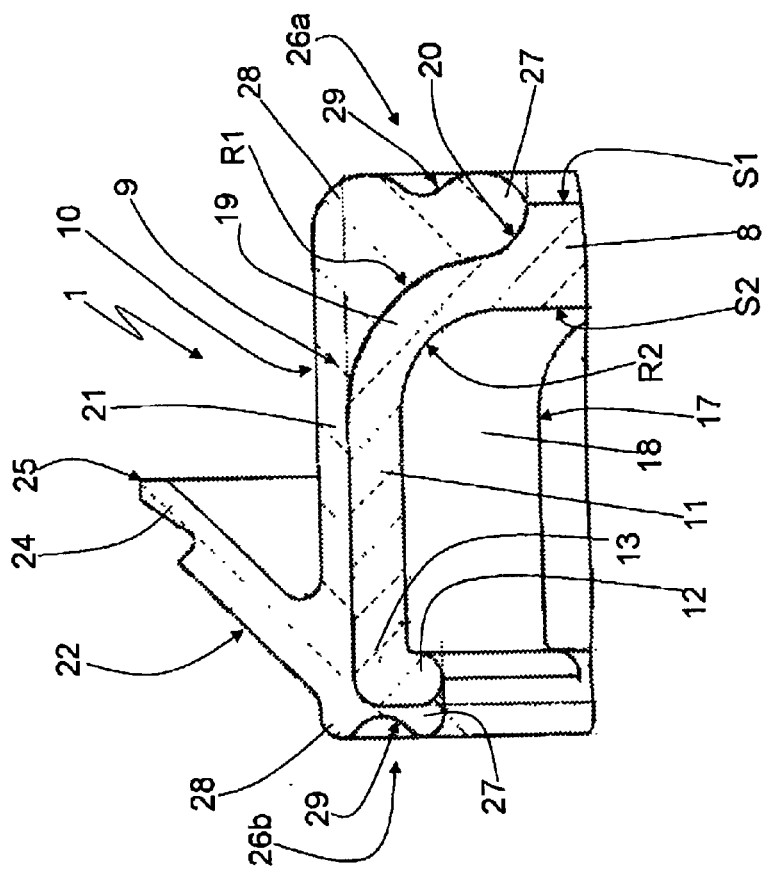
FIG. 3 illustrates, on an enlarged scale, a detail shown in FIG. 1.

With reference to FIG. 1, the number 1 indicates a sealing device for rolling bearings in its entirety.

In particular, the rolling bearing 2 is mounted onto a cylindrical tube 3 which presents a blocking moulding 4, which is arranged under an inner race 5 of the rolling bearing 2, and which is suitable for being arranged in contact with a shoulder 6 of a constant velocity universal joint 7 by means of the interposition of the sealing device 1.

The sealing device 1 comprises a distance ring 8 which is made of plastic material and which is interposed between the blocking moulding 4 and the shoulder 6; the device 1 also comprises a snap fastening element 9 which is integral to the distance ring 8 and which is used for fastening the distance ring 8 itself to the blocking moulding 4; the sealing device 1 also comprises a covering 10 which is made of rubber material and which is arranged outside the element 9 in order to guarantee a static seal between the inner race 5 and the blocking moulding 4 and between the blocking moulding 4 and the shoulder 6.

The distance ring 8 is arranged transversally to a rotation axis A (FIG. 2) of the rolling bearing 2, and it presents a constant radial thickness, and it is axially delimited by two flat surfaces S1 and S2, of which the flat surface S1 is an external surface which is arranged in contact with the shoulder 6, and the flat surface S2 is an internal surface which is arranged in contact with the blocking moulding 4.

The element 9 comprises a cylindrical wall 11 which is integral to the distance ring 8, and it extends from the distance ring 8 itself towards, and around, the blocking moulding 4, and the element 9 also comprises an annular projection 12, which is arranged inside the cylindrical wall 11 in correspondence with a free end 13 of the wall 11 itself, and which interferes both axially and radially with a internal surface 14 of the blocking moulding 4.

In particular, the surface 14 of the blocking moulding 4 is inclined towards the axis A and towards an external axial surface 15 of the inner race 5 which is arranged transversally to the axis A itself, and which forms with this axial surface 15 an annular housing 16, inside of which the annular projection 12 is inserted in order to block the sealing device 1 onto the blocking moulding 4 itself.

Figure 2:
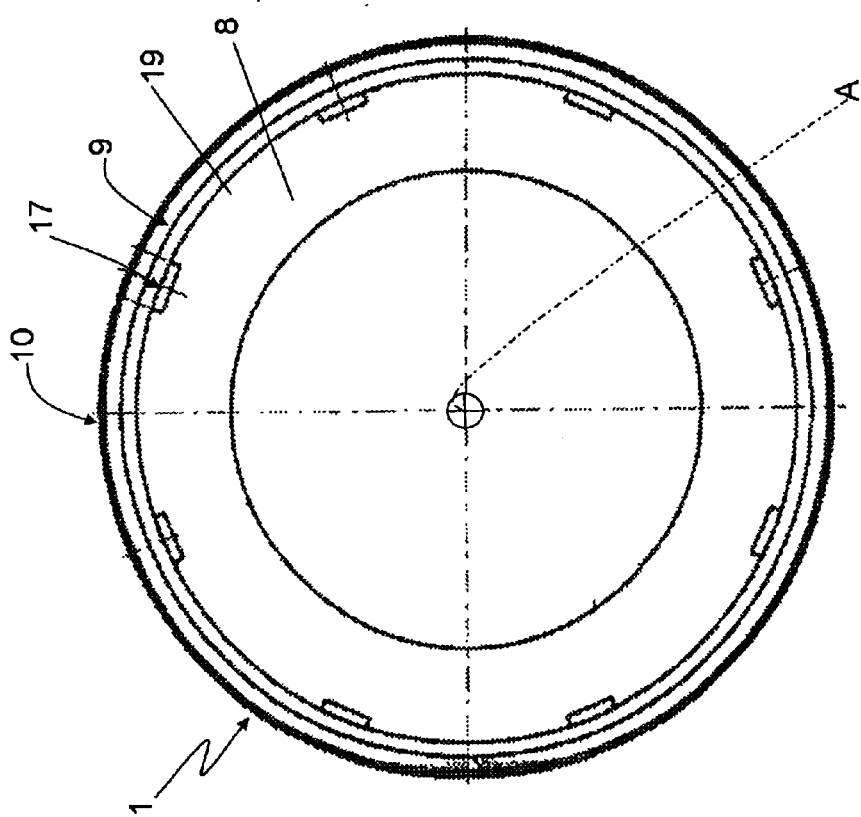
FIG. 2 is a frontal view, on an enlarged scale and with some parts removed for reasons of clarity, of the sealing device shown in FIG. 1.

The cylindrical wall 11 presents a thickness which is less than the thickness of the distance ring 8 and, as is better illustrated in FIGS. 2 and 3, it comprises a number of axial notches 17, which are equally spaced along the wall 11 and around the axis A and which define, in the wall 11 itself, a number of elastically yieldable bending tongues 18 which are connected to the distance ring 8 by means of respective curved sections 19 which are integral parts of the tongues 18 themselves.

The notches 17 extend parallel to the axis A for the whole length of the wall 11, and they also involve the projection 12, which is thus subdivided into as many sections as there are tongues 18, while the curved sections 19 present a thickness which is equal to the thickness of the wall 11, and they are internally delimited by a curved surface R2 which is directly connected to the flat surface S2, while due to the fact that their own thickness is less than that of the distance ring 8, they are externally delimited by a curved surface R1 which is connected to the flat surface S1 by means of a connecting surface 20 which presents a curvature which is opposite that of the curvature of the curved surface R1 itself.

The external covering 10 comprises a cylindrical base layer 21, which is arranged in such a way as to completely cover and be in direct contact with the tongues 18, and it is also arranged inside the notches 17 in order to further improve the elasticity of the tongues 18 themselves.

The covering 10 also comprises a conical sealing appendix 12 which extends from the base layer 21 towards the outside of the covering 10 itself and which is suitable for working with a lid 23 of the rolling bearing 2 in order to also guarantee a dynamic seal for the rolling bearing 2 itself. The appendix 22 is positioned with its own concavity towards the outside of the rolling bearing 2, and it is provided with an end border 24 which presents a thickness which is less than a thickness of the appendix 22 itself.

In particular, the border 24 is delimited by a squared end surface 25 in order to increase the sealing capacity with the lid 23, and it presents an increasing thickness towards the surface 25 itself starting from its respective point of origin with the rest of the appendix 22, which in turn presents is own point of origin from the area of the base layer 21 which is substantially arranged in correspondence to the projection 12.

Finally, the covering 10 also comprises two sealing lips 26, which are arranged opposite the wall 11, and which project axially in relation to the wall 11 itself in to be, respectively, compressed between the wall 11 and the shoulder 6 and between the wall 11 and the axial surface 15 of the inner race 5.

In particular, each lip 26 is defined by two rounded annular protuberances 27 and 28 which are radially separate from each other by an intermediate annular groove 29 which presents a substantially semi-circular shaped base surface. The protuberance 27 is radially arranged inside the groove 29, while the protuberance 28 is radially arranged outside the groove 29 itself.

The protuberance 27 of the lip 26a, or rather of the lip 26 which is turned towards the shoulder 6, extends in contact with the surface R1 and the surface 20 as far as the flat surface S1 and it projects axially in relation to the flat surface S1 itself, while the protuberance 27 of the lip 26b, or rather of the lip 26 which is turned towards the inner race 5 of the rolling bearing 2, covers the projection 12 of the part of the projection 12 which is axially turned towards the axial surface 15.

The dimensions of the protuberances 27 and 28 of each lip 26 are substantially identical to each other, but the dimensions of the protuberances 27 and 28 of the lip 26b are axially and radially greater than the dimensions of the protuberances 27 and 28 of the lip 26a.

When in use, the sealing device 1 is mounted onto the blocking moulding 4 after the cover 23 has been mounted and assembly is carried out by exerting an axial pressure onto the sealing device 1 which is sufficient to overcome the elastic resistance of both the layer 21 and the tongues 18 in such a way as to push the blocking moulding 4 itself over the projection 12 so that the projection 12 itself may be housed inside the housing 16.

At this point, the sealing device 1 and the relative rolling bearing 2 are coupled to the universal joint 7 in such a way that the distance ring 8 is closed between the blocking moulding 4 and the shoulder 6, and the relative flat surfaces S1 and S2 are arranged in direct contact with the blocking moulding 4 and the shoulder 6 themselves. In this way, any direct contact is avoided between the blocking moulding 4 and the shoulder 6 and it is also possible to completely eliminate the above-mentioned background noise which is produced by this kind of contact when the rolling bearing 2 is heavily loaded.

When the sealing device 1 and the rolling bearing 2 are being assembled, the appendix 22 is radially compressed between the cover 23 and the wall 11, and the border 24 is arranged in direct contact with the cover 23 in such a way as to create a sliding contact dynamic sealing action because the appendix 22 and the cover 23 revolve in relation to each other. In the same way, once the projection 12 has been inserted into the housing 16 the lip 26b is arranged in direct contact with the axial surface 15 of the inner race 5 in such a way as to create a static seal which prevents the entry of impurities between the blocking moulding 4 and the inner race 5 itself.

Once the rolling bearing 2 has been coupled to the universal joint 7 the lip 26a is arranged in direct contact with the shoulder 6 is such a way as to create, in turn, a static seal which prevents the entry of impurities between the distance ring 8 and the shoulder 6.

In this way, the sealing device presents certain advantages due to the presence of the distance ring 8, but it also presents advantages which are connected to the static and dynamic seal which is effected between the various structural elements at issue and has the overall benefit of a longer working life for the structural elements themselves.

It is not intended that the present invention be limited to the form of embodiment herein described and illustrated, which is to be considered as a form of embodiment of a sealing device 1 which may be subject to further modifications in terms of the shape and arrangement of its parts, or in terms of details pertaining to its construction and assembly.

What is claimed is:

1. Sealing device for a rolling bearing comprising an inner race, which is axially blocked by a blocking element which is suitable for being arranged in direct contact with a reference element, wherein the sealing device comprises a distance ring which is made of plastic material and which is interposed between the blocking element and the reference element; a snap fastening means which is integral to the distance ring and which is used for fastening the distance ring to the blocking element; and an external covering which is made of rubber material and which is arranged outside the snap fastening means in order to guarantee at least one static seal between the inner race and the blocking element and between the blocking element and the reference element.

2. Sealing device according to claim 1, wherein the distance ring presents a constant radial thickness and is axially delimited by two flat surfaces, of which a first flat surface is an external surface which is arranged in contact with the reference element, and a second flat surface which is an internal surface which is arranged in contact with the blocking element.

3. Sealing device according to claim 2, wherein the snap fastening means comprises a cylindrical wall which is integral to the distance ring, and an annular projection which is inside the cylindrical wall and which is suitable for interfering both axially and radially with an internal surface of the blocking element.

4. Sealing device according to claim 3, wherein the cylindrical wall comprises a number of notches, which are equally spaced along the cylindrical wail and which define, in the cylindrical wall, an equal number of elastically yieldable bending tongues which are connected to the distance ring.

5. Sealing device according to claim 4, wherein the said external covering comprises a cylindrical base layer which is arranged so as to provide total cover of, and which is in direct contact with, said tongues and which is also arranged inside the said notches.

6. Sealing device according to claim 5, wherein the external covering comprises a conical sealing appendix which extends from the cylindrical layer towards the outside of the external covering and which is suitable for working with a cover of the rolling bearing in order to also guarantee a dynamic seal for the rolling bearing.

7. Sealing device according to claim 6, wherein the conical appendix is positioned with its own concavity facing towards the outside of the rolling bearing, and is provided with an end border which presents a lesser thickness in relation to the thickness of the conical appendix.

8. Sealing device according to claim 7, wherein the external covering comprises two sealing lips, which are arranged opposite the cylindrical wall of the snap fastening means and which project axially in relation to the snap fasting means in order to be compressed between the snap fasting means and, respectively, the said reference device and the inner race.

9. Sealing device according to claim 8, wherein each sealing lip is defined by two annular protuberances which are rounded and are radially separated from each other by an intermediate annular groove which presents a substantially semi-circular shaped base surface.

10. Sealing device according to claim 9, wherein each sealing lip presents a radially internal annular protuberance and a radially external annular protuberance, of which the radially internal annular protuberance is turned towards the reference element and which extends as far as the first flat surface and which projects axially in relation to the first flat surface, while the internal annular protuberance is turned towards the inner race of the rolling bearing and axially covers the internal annular projection.

11. Sealing device according to claim 10, wherein the conical sealing appendix begins substantially in correspondence with the sealing lip which is turned towards the inner race of the rolling bearing.

* * * * *